United States Patent Office 2,739,080
Patented Mar. 20, 1956

2,739,080

PROCESS FOR DYEING A SHEET OF PLASTICIZED POLYVINYL BUTYRAL RESIN AND INK THEREFOR

Chester L. Woodworth, Longmeadow, Mass., assignor to Monsanto Chemical Company, St. Louis, Mo., a corporation of Delaware No Drawing. Application August 28, 1951, Serial No. 244,101

6 Claims. (Cl. 117—38)

This invention relates to new printing ink compositions. More particularly, the invention relates to printing inks for coloring and printing plasticized polyvinyl butyral sheets and processes of coloring such sheets.

Several methods have been developed for coloring polyvinyl butyral sheeting either in solid colors, a single color of graduated density, or in patterns. Among these methods are spraying the sheet with a solution of dye in an active solvent for the sheet, dipping the sheets in a similar solution and printing the sheets by rotogravure printing methods.

The rotogravure method is the simplest and least expensive and for many purposes it is fully adequate. However, when attempts are made to print a transparent or translucent solid color on the polyvinyl butyral sheet, many difficulties are encountered, particularly for sheets to be used in preparing laminated glass. These sheets have a rough surface similar to a matte surface and do not take the known printing inks well. Spots, striations and blotches appear which render the printed sheet unusable in laminated glass. Furthermore, most printing inks impair the adhesion of the sheets to glass.

One object of this invention is to provide a new printing ink.

A further object is to provide a printing ink suitable for printing plasticized polyvinyl butyral sheets.

Another object is to provide a printing ink suitable for use in gravure printing machines.

Still another object is to provide a printing ink for plasticized, polyvinyl butyral sheets which will not impair the adhesion of the sheets to glass.

These and other objects are attained by a composition comprising a polyvinyl butyral resin, a solvent for the resin, a plurality of dyes taken from narrowly limited dye classes as hereinafter more explicity described and a solvent for the dye.

The following examples are given in illustration and are not intended as limitations on the scope of this invention. Where parts are mentioned, they are parts by weight.

Example I

A printing ink was prepared by dissolving 5.5 parts of Ero Blue dye (Patent Chemical Company) and 2 parts of Calco oil-soluble yellow in 110 parts of cyclohexanone. To this solution were added, 3 parts of triethylene glycol-di(2-ethyl butyrate) plasticizer and 3 parts of a polyvinyl butyral resin. The mixture was stirred at room temperature until a homogeneous solution was obtained. The ink had a viscosity of 50 cps. The ink was used to print polyvinyl butyral resin sheets in a uniform green color using a conventional rotogravure printing press with a finely etched printing roll. The printed sheets were run through a drier to remove the solvent. The sheets were of uniform color, no color dots or specks being visible but there was a slight mottle. This mottle disappeared on heating the sheet at 60° C. for 3–6 days or on storing the sheet at room temperature for about a month. The sheets were laminated between glass plates to simulate a wind shield. No color variations were found after the laminations were completed. The adhesion of the colored plastic to glass was substantially the same as that of the untreated sheet.

Example II

Two solutions were prepared. The first was a solution of 2.7 parts of Ero Blue and 1.8 parts of Kohnstamm Orange A 9472 (C. I. No. 24) in 70 parts of propylene chloride. The second was a solution of 3.2 parts of triethylene glycol-di(2-ethyl butyrate) and 3.2 parts of polyvinyl butyral in 30 parts of ethanol. The two solutions were then blended to provide a printing ink having a viscosity of 30 cps. This ink operated as efficiently as that of Example I in the rotogravure press with two differences; (1) the ink was faster drying due to the more volatile solvents, and (2) the color was greener and duller than that of Example I.

Example III

A solution was prepared containing 4.5 parts of triethylene glycol-di(2-ethyl butyrate) and 4.5 parts of polyvinyl butyral resin dissolved in 30 parts of n-butanol. A second solution containing 4.2 parts of Ero Blue and 1.5 parts of Calco Oil Yellow dissolved in 70 parts of methyl isobutyl ketone was prepared and then blended with the resin solution. A green printing ink was obtained which was used to print polyvinyl butyral resin sheets on a rotogravure printing press having a finely knurled printing roll. The printed sheet was uniformly colored and could be laminated between glass plates to provide colored laminates having adhesion values substantially equivalent to the untreated plastic.

The printing inks of this invention are limited by (1) the resin used, (2) by the type of solvent for the resin, (3) the dyes, (4) the solvent for the dyes, and (5) the viscosity of the ink.

The resin is a polyvinyl butyral resin containing up to 20% hydroxyl groups calculated as polyvinyl alcohol, up to 3% acetate groups calculated as polyvinyl acetate with the balance of the resin being polyvinyl butyral. Resins conforming to these specifications have the required solubility, light stability and adhesiveness towards glass.

The solvent for the resin may be an alcohol, ketone, chlorinated hydrocarbon or an aromatic hydrocarbon such as the solvent naphthas. The particular solvent chosen and the amount used depends on the viscosity of the solutions made therefrom and the evaporation rate thereof.

The dyes used must be light stable in conjunction with the polyvinyl butyral resin. Many so-called stable dyes have been found unstable in this respect. Other requirements of the dyes are that they should diffuse into the resin and that they should be soluble to the extent of at least 2% in chlorinated hydrocarbon or ketone solvents. There are very few dyes which meet these requirements. Satisfactory blue colors are obtained from substituted anthraquinone dyes such as Ero Blue and Cobalt Blue which contain from 2 to 4 cyclic nuclei in the color molecule. Orange colors which are useful are Kohnstamm Orange (Colour Index No. 24) and Oil Orange which are phenyl azo-beta-naphthol dyes having from 2 to 4 cyclic nuclei in the dye molecule. Satisfactory yellow colors are azo pyrazolone dyes such as the oil yellows. Again the requirement of from 2 to 4 cyclic nuclei in the dye molecule must be met. By cyclic nuclei are meant aromatic nuclei such as benzene, naphthalene, anthracene, etc. nuclei and heterocyclic nuclei such as pyrazolone rings. The amount of dye will depend on the color and intensity desired.

The solvent for the dyestuff may be a ketone or a chlorinated hydrocarbon. In some cases, such as shown in Example I, the same solvent (cyclohexanone) may be used for both dye and resin. The choice of dye solvent will depend on compatibility with the resin solvent, viscosity characteristics, evaporation rate, etc.

For good printing conditions the viscosity of the printing ink should be carefully controlled within the limits of 10–500 cps. The control is maintained by the proper choice of type and amount of resin and dye solvents. In general, the amount of solvent will vary between two and four thousand parts per 100 parts of resin.

When the ink is to be used to print on plasticized polyvinyl butyral resin sheets for safety glass purposes, it is necesary to avoid impairment of the adhesion of the sheets to glass. This is best accomplished by adding from 50 to 100 parts of a plasticizer per 100 parts of resin. Preferably, the plasticizer should be identical with the plasticizer present in the sheet. Among these plasticizers are triethylene glycol-di(2-ethyl butyrate), dibutyl sebacate and dibutyl cellosolve phthalate. Other plasticizers such as phthalates, phthalyl glycolates, etc. may be used if desired.

The ink is designed for use in a rotogravure printing apparatus using an engraved printing roll. The roll surface contains a plurality of cups or pits which hold the ink and transfer it to the polyvinyl butyral resin sheet as tiny dots of ink. The surface of the roll is prepared by photoengraving, knurling, etching and other conventional methods and the term "engraved printing roll" is intended to include a roll treated by any of these processes.

The rotogravure process essentially prints by means of a myriad of tiny dots of ink so closely spaced that for most normal purposes the printing appears to be in the form of a solid film. However, for such applications as safety glass for automobile windshields, the existence of finite color particles cannot be tolerated, i. e., the color must exist as a completely continuous film.

The continuous film is obtained in this invention by a normalizing process after printing is complete. The normalizing process comprises a conditioning period at from 20–60° C. before laminating the printed sheet to glass. The length of the normalizing period is dependent on the temperature used. At 20° C., nearly a month is necessary before a continuous color film is formed. At 60° C., a continuous film is formed in from 3 to 6 days.

The success of the normalization of the printed sheet is dependent on the diffusibility of the dyestuff into the resin sheet. The diffusibility is a property of the dyestuff used and does not appear to be influenced to any substantial degree by the solvents and plasticizers used in preparing the ink. As shown above, the number of organic dyes operable to give a continuous color film is limited and the diffusibility of the dye in the resin sheet is dependent on the presence in the dye molecule of from 2 to 4 cyclic nuclei.

By careful control of the variables enumerated above a printing ink is obtained which can be transferred smoothly and completely from an etched or otherwise engraved printing roll to polyvinyl butyral sheets. The sheets are evenly colored by the ink and after the solvents have been removed and the sheets have been normalized, they are unaltered in their superior properties for use in glass laminations.

It is obvious that variations may be made in the products and processes of this invention without departing from the spirit and scope thereof as defined in the appended claims.

What is claimed is:

1. An ink for printing on polyvinyl butyral sheets, said ink consisting of a polyvinyl butyral resin, a solvent for the resin taken from the group consisting of alcohols, ketones, chlorinated hydrocarbons and mixtures thereof, a dye taken from the group consisting of dyestuffs having 2 to 4 cyclic nuclei in the dye molecule and mixtures of such dyestuffs and a solvent for the dye taken from the group consisting of ketones, chlorinated hydrocarbons and mixtures thereof, said ink having a viscosity of from 10 to 500 centipoises.

2. An ink as in claim 1 containing, additionally, a plasticizer for the polyvinyl butyral resin.

3. An ink as in claim 2 wherein the plasticizer is triethylene glycol-di(2-ethyl butyrate).

4. An ink as in claim 1 wherein the dye is an anthraquinone dye.

5. An ink as in claim 1 wherein the dye is a phenyl azo-beta-naphthol dye.

6. A process for dyeing a sheet of plasticized polyvinyl butyral resin with an ink consisting of a polyvinyl butyral resin, a solvent for the resin taken from the group consisting of alcohols, ketones, chlorinated hydrocarbons and mixtures thereof, a dye taken from the group consisting of dyestuffs containing from 2 to 4 cyclic nuclei in the dye molecule and mixtures of such dyestuffs, a solvent for the dye taken from the group consisting of ketones, chlorinated hydrocarbons and mixtures thereof and a plasticizer for the polyvinyl butyral resin, said ink having a viscosity of from 10 to 500 centipoises, such process comprising the steps of depositing said ink on the surface of said sheet in the form of a myriad of dots, evaporating the solvent and then normalizing said printed sheet at 20–60° C. until a continuous film of color is formed therein.

References Cited in the file of this patent

UNITED STATES PATENTS

| | | |
|---|---|---|
| 1,931,485 | Caprio | Oct. 24, 1933 |
| 2,165,499 | Moss | July 11, 1939 |
| 2,260,543 | Smith | Oct. 28, 1941 |
| 2,343,781 | Locke | Mar. 7, 1944 |
| 2,442,018 | Quarles | May 25, 1948 |
| 2,486,259 | Chavannes | Oct. 25, 1949 |
| 2,601,460 | Salvin | June 24, 1952 |
| 2,609,269 | Ryan | Sept. 2, 1952 |

OTHER REFERENCES

Printing Inks, Carleton Ellis, 1940, pp. 373–376, Reinhold Pub. Corp.